United States Patent
Auner et al.

(10) Patent No.: US 9,034,291 B2
(45) Date of Patent: May 19, 2015

(54) STORAGE MATERIAL AND METHOD FOR OBTAINING H-SILANES THEREFROM

(75) Inventors: Norbert Auner, Glashuetten (DE); Christian Bauch, Muldenstein (DE); Rumen Deltschew, Leipzig (DE); Sven Holl, Gueckingen (DE); Javad Mohsseni, Bitterfeld-Wolften (DE)

(73) Assignee: Spawnt Private S.a.r.l., Luxembourg (LU)

( * ) Notice: Subject to any disclaimer, the term of this patent is extended or adjusted under 35 U.S.C. 154(b) by 184 days.

(21) Appl. No.: 13/805,762

(22) PCT Filed: Jun. 30, 2011

(86) PCT No.: PCT/EP2011/003232
§ 371 (c)(1),
(2), (4) Date: Apr. 10, 2013

(87) PCT Pub. No.: WO2012/000673
PCT Pub. Date: Jan. 5, 2012

(65) Prior Publication Data
US 2014/0093443 A1    Apr. 3, 2014

(30) Foreign Application Priority Data

Jun. 30, 2010 (DE) .......................... 10 2010 025 710

(51) Int. Cl.
*C01B 33/04* (2006.01)
*C01B 33/12* (2006.01)

(52) U.S. Cl.
CPC ................. *C01B 33/04* (2013.01); *C01B 33/12* (2013.01); *Y10S 502/526* (2013.01)

(58) Field of Classification Search
USPC ............................ 423/347; 502/401, 402, 526
See application file for complete search history.

(56) References Cited

U.S. PATENT DOCUMENTS

| | | |
|---|---|---|
| 2009/0226355 A1 | 9/2009 | Laine et al. |
| 2010/0004385 A1 | 1/2010 | Auner et al. |
| 2011/0150740 A1 | 6/2011 | Auner et al. |

FOREIGN PATENT DOCUMENTS

| | | |
|---|---|---|
| DE | 2 139 155 | 2/1973 |
| EP | 1 357 154 | 5/2012 |
| JP | 49-1505 | 1/1974 |
| JP | 49-18222 | 2/1974 |
| JP | 49-98400 | 9/1974 |
| JP | 63-89414 | 4/1988 |
| JP | 1-100010 | 4/1989 |
| JP | 2003-313299 | 11/2003 |
| JP | 2008-174416 | 7/2008 |
| JP | 2008-542162 | 11/2008 |
| JP | 2011-520762 | 7/2011 |
| WO | 2007/044429 A2 | 4/2007 |
| WO | 2008/031427 | 3/2008 |
| WO | 2010/003729 | 1/2010 |

OTHER PUBLICATIONS

Fehér, F. et al., "Contributions to the Chemistry of Silicon and Germanium, XXXII [1] Isomerization of Higher Silanes with Aluminum Chloride," *Z. Naturforsch*, 1980, vol. 35b, pp. 869-872.
Kennedy, R.C. et al., "Formation and Cleavage of the Silicon-Silicon Bond in Disilane," *Journal of Inorganic and Nuclear Chemistry*, 1966, vol. 28, pp. 1373-1376.
Schwarz, V.R. et al., "Über ungesättigte Siliciumhydride," *Zeitschrift für anorganische und allgemeine Chemie*, 1935, pp. 277-286.
Timms, P.L. et al., "Silicon-Fluorine Chemistry. I. Silicon Difluoride and the Perfluorosilanes," *Journal of the American Chemical Society*, Jul. 5, 1965, vol. 87, No. 13, pp. 2824-2828.
English translation of the Chinese Office Action dated Aug. 5, 2014 from corresponding Chinese Application No. 201180031565.0.
Japanese Office Action dated Feb. 17, 2015 from corresponding Japanese Application No. 2013-517083.

*Primary Examiner* — Edward Johnson
(74) *Attorney, Agent, or Firm* — DLA Piper LLP (US)

(57) ABSTRACT

A storage material for obtaining H-silanes which is present in the form of a hydrogenated polysilane (HPS), as a pure compound or as a mixture of compounds having on average at least six direct Si—Si bonds, the substituenis of which predominantly consist of hydrogen and in the composition of which the atomic ratio of sabstitueot to silicon is at least 1:1.

22 Claims, No Drawings

STORAGE MATERIAL AND METHOD FOR OBTAINING H-SILANES THEREFROM

RELATED APPLICATIONS

This is a §371 of international Application No. PCT/EP2011/003232, with an international filing date of Jun. 30, 2011 (WO 2012/000673 A1 published Jan. 5, 2012), which is based on German Patent Application No. 10 2010 025 710.9 filed Jun. 30, 2010, the subject matter of which is incorporated herein by reference.

TECHNICAL FIELD

This disclosure relates to a storage material and to a method for obtaining H-silanes therefrom.

BACKGROUND

Gaseous or vaporizable, i.e., short-chain, H-silanes $Si_nH_{2n+2}$ are important starting materials for processes in which silicon is to be deposited on surfaces, for example, is CVD processes or for preparation of solutions (for ink-jet processes, for example). One decisive disadvantage of short-chain H-silanes is that the lower representatives (n=1,2) are gaseous and therefore only handleable in pressurized gas flasks. Further, all H-silanes up to a chain length of n=6 are without exception pyrophoric and therefore require appreciable safety precautions to be stored in a comparatively large amount. Yet the high vapor pressure of short-chain H-silanes is advantageous for gas phase processes since it ensures high concentrations of the silanes in the gas phase.

There is accordingly a need for a safe form of storing short-chain H-silanes and for a suitable method of releasing them as or when required.

It is known from DE 2139155, for example, that polysilanes $Si_nH_{2n+2}$ having a chain length of n=7 or more are nonpyrophoric in air.

There are several known methods of releasing short-chain H-silanes from longer-chain polysilanes:

a) Thermal Decomposition

Polysilanes decompose into silicon and hydrogen at high temperature. However, that thermolysis starts at as low a temperature as close to 300° C. and then leads to hydrogen, short-chain silanes $Si_nH_{2n+2}$ and also polymeric products $(SiH_{<2})_x$, as known, for example, from R. Schwarz, F. Heinrich, Zeitschrift für anorganische und allgemeine Chemie 1935 (221) 277. The disadvantage with that method is the low yield of short-chain silanes obtained from the starting material since the thermolysis generates silicon-containing residues.

b) Catalytic Polymerization

It is know from R. C. Kennedy, L. P. Freeman, A. P. Fox, M. A. Ring, Journal of inorganic and nuclear chemistry 1966 (28) 1373, for example, that silanes having at least one Si—Si bond will in the presence of suitable catalysts such as lithium salts polymerize at comparatively low temperatures to form higher polysilanes $(SiH_2)_x$ by elimination of $SiH_4$. The disadvantage with that method is that only one molecule of $SiH_4$ is formed per starting molecule $Si_nH_{2n+2}$ during polymerization and the yield of short-chain material for safe storage substances with n>6 remains small. F. Feher, F. Ocklenburg, D. Skrodzki, Zeitschrift für Naturforschung 1980 (35b) 869 report that higher oligosilanes react with approximately equimolar amounts of $AlCl_3$ on heating to eliminate $SiH_4$ and a little di- and trisilane and form a yellow polymer having a composition of $SiH_{0.98}$. A slowed polymerization is observed even at lower amounts of $AlCl_3$ in aromatic solvents and at temperatures of not more than 85° C. Although the polymer contains less hydrogen, scarcely more than 50% of the starting silicon is released as short-chain silanes in the case of silanes where n>6.

c) Reaction of Polyfluorosilane with Hydrofluoric Acid

P. L. Timms, R. A. Kent, T. C. Ehlert, J. L. Margrave, Journal of the American Chemical Society 1965 (87) 2824 discloses a method that leads to formation of polysilanes from polyfluorosilanes $(F_2Si)_x$. The material is admixed with hydrofluoric acid and silanes having a chain length n up to 6 can be isolated in that only fully hydrogenated compounds $Si_nH_{2n+2}$ are formed. The disadvantage is again the low yield of silanes since, during the reaction, $H^+$ from the acid is formally reduced to hydride while at the same time $SiO_2$ is formed, for example:

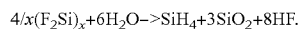

$$4/x(F_2Si)_x + 6H_2O \rightarrow SiH_4 + 3SiO_2 + 8HF.$$

None of the cited processes demonstrate an efficient production of H-silanes in usable yields. The known methods also lack a storage material (storable form) that can be provided in the amounts needed.

It could therefore be helpful to provide a safe storable form for H-silanes and a method for recovering these.

SUMMARY

We provide a storage material for obtaining hydrogenated silanes (H-silanes) including hydrogenated polysilane as a pure compound or mixture of compounds having on average at least six direct Si—Si bonds, substituents of which consist predominantly of hydrogen and are in a composition of which atomic ratio for substituent:silicon is at least 1:1.

DETAILED DESCRIPTION

Hydrogenated silanes (H-silanes) can be present as a pure compound or as a mixture of compounds and are obtainable from the storage material by degradation or further reaction in that preferentially H-silanes $Si_nH_{2n+2}$ and/or $Si_nH_{2n}$ where n=1-6 are generated.

The hydrogenated polysilane (HPS) used as storage material is by virtue of its chain length nonpyrophoric, merely oxidizing slowly on contact with air. The HPS in its use as a storage material is in solid and/or liquid form. Hydrogenated polysilanes that are solids in pure form may be wholly or partly dissolved in liquid hydrogenated polysilanes.

Especially solid HPS can further be processed into shaped articles, for example, pellets or ingots, for improved handling and/or to reduce the oxidation sensitivity of solid polysiloxane mixtures. Production of shaped articles can be combined with addition of additives to further cohere the shaped articles and/or reduce the oxidation sensitivity of polysilanes present therein.

Shaped articles can be produced at up to temperatures at which the room temperature solid polysilane mixtures melt wholly or partly, but do not yet decompose.

The shaped articles can also be subsequently overcoated with a functional layer, for example, to reduce attrition, make the shaped articles cohere better and/or reduce their sensitivity to oxidation.

Advantageously, the hydrogenated polysilane HPS may be kept in a transport container before further use, the surface of which does not transmit light and the interior of which is blanketed with an inert gas. Further advantageously, this transport container may be equipped with a withdrawal device with which the HPS can be withdrawn in metered fashion and fed to the further use.

Possible storage materials show their significant vibration bands in IR molecular vibration spectra in the region below 2400 wavenumbers, the measurement having been carried out on an FT/IR-420 spectrometer from Jasco Corp. as KBr compact.

Possible storage materials show their significant vibration bands in Raman molecular vibration spectra in the region below 2300 wavenumbers and preferably in the range of 2000-2200 wavenumbers, the measurement having been carried out on an XY 800 spectrometer from Dilor with tunable laser excitation (T-sapphire laser, pumped by Ar-ion laser) and confocal Raman and luminescence microscope, liquid nitrogen cooled CCD detector, measuring temperature equal to room temperature, excitation wavelengths in the visible spectrum, inter alia 514.53 nm and 750 nm.

Possible storage materials display chemical shifts in the $^{29}$Si NMR spectra from ~50 ppm to ~170 ppm, preferably from ~70 ppm to ~130 ppm, the $^{29}$Si NMR spectra having been recorded on a 250 MHz instrument of the Bruker DPX 250 type with the pulse sequence zg30 and referenced against tetramethylsilane (TMS) as external standard [$\delta(^{29}Si)$=0.0]. The acquisition parameters are: TO=32 k, AQ=1,652 s, D1=10s, NS=2400, O1P=~40, SW=400.

A particularly suitable storage material is characterized by the following features: a) has its significant vibration bands in IR molecular vibration spectra in a region below 2300 wavenumbers, b) has a significant vibration band in RAMAN molecular vibration spectra in a region of 2000~2200 wavenumbers and c) has its significant product signals in $^{29}$Si NMR spectra in a chemical shift range of −70 ppm to −130 ppm.

Average chain length of the hydrogenated polysilane is preferably greater than 6 and less than 100, more preferably greater than 10 and less than 50 and even more preferably greater than 15 and less than 30. The hydrogenated polysilane is colorless to light yellow and advantageously has a metal content of less than 1%. It preferably contains virtually no short-chain branched chain or ring compounds while the level of branching points in the short-chain fraction is preferably less than 2%, based on the product mixture as a whole.

Particularly preferably, the substituents of the hydrogenated polysilane consist exclusively of hydrogen.

The hydrogenated polysilane preferably has predominantly linear long chains, is viscid to solid and soluble in suitable inert solvents. It more particularly contains less than 1 atom % of halogen.

The method for obtaining H-silanes is characterized in that these are obtained from a storage material of the type described above.

This method releases H-silanes, especially short-chain H-silanes from the storage material which represents a safe storable form, as and when required.

The storage material may be produced in a first step and H-silanes are obtained therefrom in a second step.

Preferably, the H-silanes are obtained from the storage material by one or more steps of synthesis as follows: a) thermolysis of hydrogenated polysilanes (HPS), at a pressure of 0.1-1013 hPa; b) ring-opening polymerization of cyclosilanes ($Si_nH_{2n}$), where n=4,5,6, and at a pressure of 0.1-1013 hPa; c) catalytic chain extension conducted at a pressure of 1-300 bar; d) treating the hydrogenated polysilane (HPS) with activated hydrogen species at a pressure of 0.1-1013 hPa; e) basic hydrolysis of the hydrogenated polysilane (HPS) in presence of low concentrations of strong bases or substoichiometric amounts of base or in presence of weak bases at a pressure of 0.1-1013 hPa; f) admixing the hydrogenated polysilane (HPS) with chemical hydrogenating agents and thermal treatment, at a pressure of 1~300 bar; g) admixing the hydrogenated polysilane (HPS) with one or more transition metals and applying hydrogen, at a pressure of 1 ~300 bar; and h) reaction of hydrogenated polysilane (HPS) with hydrofluoric acid or water-containing HF or HF gas or liquid HF at a pressure range of 0.1~1013 hPa. The individual aspects are reproduced hereinbelow:

The H-silanes may be obtained by thermolysis of HPS. The pressure can be reduced for augmentation, for example, so that H-silanes of lower vapor pressure may be obtained. This may further serve to improve the conversion of the storage material into H-silanes. It is preferable to employ a pressure range of 0.1~1013 hPa.

The HPS may be converted into H-silanes by ring-opening polymerization of cyclo-silanes ($Si_nH_{2n}$), where n is=4 to 10, in the HPS. It is preferable to employ a pressure range of 0.1~1013 hPa.

The HPS may be converted into the desired H-silanes by catalytic chain extension, which is preferably done in a pressure range of 1-300 bar. What may be concerned here is a dehydrogenating polycondensation with transition metal catalysts, for example.

The HPS may be treated with activated hydrogen species. These are obtainable, for example, by reaction of a strong electromagnetic alternating field or of an electric discharge on hydrogen gas. Activated hydrogen species are hydrogen molecules in an excited electronic state; hydrogen atoms; and also ionized hydrogen molecules or hydrogen ions. It is preferable to employ a pressure of 0.1-1013 hPa.

The HPS may be subjected to a basic hydrolysis under conditions which lead to the release of silanes, especially by the presence of low concentrations of strong bases, substoichiometric amounts of a base or use of weak bases, for which it is preferable to employ a pressure of 0.1~1013 hPa. Water and alcohols are suitable hydrolysis reagents. Alkali metal hydroxides are examples of strong bases and organic amines are examples of weak bases. A low concentration of strong bases is a concentration which produces a pH of 8 to 13 in aqueous solution. A substoichiometric amount of a base for the purposes of the invention is a base quantity insufficient to convert the HPS into silicate salts according to the exemplary reaction equation

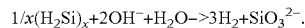
$$1/x(H_2Si)_x + 2OH^- + H_2O \rightarrow 3H_2 + SiO_3^{2-}.$$

Chemical hydrogenating agents such as metal hydrides may be added to the HPS and a hydrogenation of Si—Si bonds may be brought about by thermal treatment. Hydrides of transition metals or aluminum hydride are examples of suitable metal hydrides. The reaction can also be carried out in inert solvents. It can be augmented with coordinating solvents such as, for example, dialkyl ethers or polyethers. It is preferable to employ a pressure of 1-300 bar.

The HPS may be admixed with one or more suitable transition metals, and hydrogen may be applied to cause the HPS to split into short-chain H-silanes. Suitable transition metals are preferably Pt, Pd, Ni, Ti. The reaction with hydrogen can take place in inert solvents. A preferred method of admixing the HPS with transition metals is mechanical alloying by conjointly milling the HPS with the added metal. The transition metals can also be added in the form of compounds, for example, organic complexes, halide salts or hydrides. The hydrogen is preferably applied at a pressure of 1-300 bar.

HPS may be reacted with an aqueous solution of HF (hydrofluoric acid), water-containing HF or dry HF in the liquid or gaseous state. The reaction with hydrofluoric acid can be represented for example by the following idealized reaction equation:

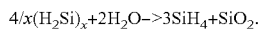

$$4/x(H_2Si)_x + 2H_2O \rightarrow 3SiH_4 + SiO_2.$$

The yield of silanes is appreciably improved compared with the use of polyfluorosilane by avoiding the H+ reduction to hydride. In the absence of water, the following exemplary idealized reaction equation can be formulated:

$$4/x(H_2Si)_x + 4HF \rightarrow 3SiH_4 + SiF_4.$$

The resultant mixture of H-silanes and fluorosilanes can be purified by selective absorption of $SiF_4$. The reaction can also be carried out in the presence of inert solvents. The resultant H-silanes can be freed of water fractions via suitable drying methods e.g., adsorption methods. It is preferable to employ a pressure of 0.1-1013 hPa.

In general, in methods for releasing the H-silanes from the storage material by one or more steps of synthesis, the reactor parts in which the HPS is converted are maintained at a temperature of −70° C. to 300° C., especially −20° C. to 280° C. The temperature of the reatants is maintained at −70° C. to 300° C., especially at −20° C. to 280° C.

The polysilane and/or the H-silanes preferably meet the requirements for uses in the manufacture of semiconductors.

Herein the terms "short-chain" and "short chain length" relate to those compounds where n is=1 to 6.

"Virtually no" is to be understood as meaning that there is less than 2% in the mixture. "Predominantly" is to be understood as meaning that the constituent referred to is present in the mixture at more than 50%.

"Inert solvents" is to be understood as meaning solvents which, under standard conditions, do not react spontaneously with the hydrogenated polysilanes (hereinafter also referred to as "polysilane"), examples being $SiCl_4$, benzene, toluene, paraffin, and the like.

Obtaining a storage material will now be described with reference to an example:

25.7 g of a substantially chlorinated polysilane mixture obtained by plasma-chemical methods are dissolved in 350 ml of benzene and are added dropwise with stirring at 0° C. in 180 mL of a 1 M $LiAlH_4$ solution in diethyl ether. This is followed by gradual warming to room temperature. After altogether 24 h, the solid precipitate is filtered off and washed with benzene. The residue is extracted with altogether 400 mL of absolute ethanol at room temperature to remove lithium salts and, as residue, 3.85 g of solid polysilane mixture are isolated as storage material.

The invention claimed is:

1. A storage material for obtaining hydrogenated silanes (H-silanes) comprising hydrogenated polysilane as a pure compound or mixture of compounds having on average at least six direct Si—Si bonds, substituents of which consist predominantly of hydrogen and are in a composition of which an atomic ratio for substituent:silicon is at least 1:1.

2. The storage material according to claim 1, characterized in that the hydrogenated polysilane
   a) has its significant vibration bands in IR molecular vibration spectra in a region below 2300 wavenumbers,
   b) has a significant vibration band in RAMAN molecular vibration spectra in a region of 2000-2200 wavenumbers,
   c) has its significant product signals in $^{29}Si$ NMR spectra in a chemical shift range of −70 ppm to −130 ppm.

3. The storage material according to claim 1, wherein the average chain length of the hydrogenated polysilane is greater than 6 and less than 100.

4. The storage material according to claim 1, wherein the hydrogenated polysilane is colorless to light yellow.

5. The storage material according to claim 1, wherein the hydrogenated polysilane has a metal content of less than 1%.

6. The storage material according to claim 1, wherein the hydrogenated polysilane contains virtually no short-chain branched chain or ring compounds while level of branching points in the short-chain fraction is less than 2%, based on the product mixture as a whole.

7. The storage material according to claim 1, wherein substituents of the hydrogenated polysilane consist of hydrogen.

8. The storage material according to claim 1, wherein the hydrogenated polysilane contains predominantly linear long chains.

9. The storage material according to claim 1, wherein the hydrogenated polysilane is viscid to solid.

10. The storage material according to claim 1, wherein the hydrogenated polysilane is soluble in suitable inert solvents.

11. The storage material according to claim 1, wherein the hydrogenated polysilane contains less than 1 atom % of halogen.

12. A method of obtaining hydrogenated silanes (H-silanes), comprising extracting the hydrogenated silanes from the storage material according to claim 1.

13. The method according to claim 12, wherein the storage material is produced in a first step and H-silanes are obtained therefrom in a second step.

14. The method according to claim 12, wherein the hydrogenated silanes (H-silanes) are extracted from the storage material by one or more of the following steps of synthesis:
   a) thermolysis of hydrogenated polysilanes (HPS), at a pressure of 0.1-1013 hPa;
   b) ring-opening polymerization of cyclosilanes ($Si_nH_{2n}$), where n=4, 5, 6, and at a pressure of 0.1-1013 hPa;
   c) catalytic chain extension conducted at a pressure of 1-300 bar;
   d) treating the hydrogenated polysilane (HPS) with activated hydrogen species at a pressure of 0.1-1013 hPa;
   e) basic hydrolysis of the hydrogenated polysilane (HPS) in presence of low concentrations of strong bases or substoichiometric amounts of base or in presence of weak bases at a pressure of 0.1-1013 hPa;
   f) admixing the hydrogenated polysilane (HPS) with chemical hydrogenating agents and thermal treatment, at a pressure of 1-300 bar;
   g) admixing the hydrogenated polysilane (HPS) with one or more transition metals and applying hydrogen, at a pressure of 1-300 bar; and
   h) reaction of hydrogenated polysilane (HPS) with hydrofluoric acid or water-containing HF or HF gas or liquid HF at a pressure of 0.1-1013 hPa.

15. The method according to claim 14, wherein the activated hydrogen species are extracted by action of electromagnetic alternating fields or of electric discharges on hydrogen gas.

16. The method according to claim 14, wherein extraction of hydrogenated silanes (H-silanes) is carried out in an inert solvent.

17. The method according to claim 14, wherein admixing the hydrogenated polysilane (HPS) with one or more transition metals is effected by mechanical alloying.

18. The method according to claim 14, wherein Pt, Pd, Ni and/or Ti is used as a transition metal.

19. The method according to claim 14, wherein one or more transition metals are added in the form of compounds.

20. The method according to claim 14, wherein products of reacting hydrogenated polysilane (HPS) with HF are purified by absorption of $SiF_4$.

21. The method according to claim 14, wherein reactor parts in which the HPS is decomposed are maintained at a temperature of $-70°$ C. to $300°$ C.

22. The method according to claim 14, wherein temperature of the readmits is maintained at $-70°$ C. to $300°$ C.

* * * * *